United States Patent [19]
Harbster et al.

[11] Patent Number: 5,595,712
[45] Date of Patent: *Jan. 21, 1997

[54] CHEMICAL MIXING AND REACTION APPARATUS

[75] Inventors: Kevin H. Harbster, Newark, Del.; Joseph A. Perrotto, Landenberg, Pa.

[73] Assignee: E. I. Du Pont de Nemours and Company, Wilmington, Del.

[ * ] Notice: The term of this patent shall not extend beyond the expiration date of Pat. No. 5,534,328.

[21] Appl. No.: 280,046

[22] Filed: Jul. 25, 1994

[51] Int. Cl.$^6$ ............................................. B01F 5/00
[52] U.S. Cl. ........................ 422/129; 422/187; 422/224; 366/338; 366/339; 156/290
[58] Field of Search ........................ 422/129, 187, 422/177, 190, 196, 224; 366/336–340; 138/38, 42; 261/78.2, DIG. 26; 156/290, 292, 60; 264/177.16, 75, 171, 349, 328.6; 425/131.5, DIG. 217

[56] References Cited

U.S. PATENT DOCUMENTS

| | | | |
|---|---|---|---|
| 3,459,407 | 8/1969 | Hazelhurst et al. | 366/338 |
| 3,701,619 | 10/1972 | Appledoorn et al. | 425/198 |
| 3,856,270 | 12/1974 | Hemker | 366/340 |
| 3,881,701 | 5/1975 | Schoenman et al. | 366/340 |
| 4,002,289 | 1/1977 | Moore | 206/219 |
| 4,222,671 | 9/1980 | Gillmore | 366/337 |
| 4,593,446 | 6/1986 | Hayner | 29/890.09 |
| 4,869,849 | 9/1989 | Hirose et al. | 261/78.2 |
| 5,037,619 | 8/1991 | Alagy et al. | 422/191 |
| 5,094,788 | 3/1992 | Schrenk et al. | 366/340 |

Primary Examiner—Robert J. Warden
Assistant Examiner—Hien Tran

[57] ABSTRACT

An integral structure is provided for chemical processing, particularly high-speed mixing and chemical reacting, in which a plurality of laminae are joined together and having inlet and outlet ports connected by a plurality of intersecting channels formed therethrough which accommodate the passage of one or more chemicals, said laminae comprising a material selected for compatibility with the one or more chemicals, the channels being formed so that chemicals are combined at intersections therein at sufficient angles of attack and shear rates so that chemical reactions are not limited by mass transfer. Chemicals are introduced through the inlet ports and processed along the channel, with desirable product withdrawn through the outlet ports. The laminae are selected from material of groups III, IV or V of the Periodic Table. Processes of manufacture of the apparatus and processes utilizing the apparatus are also disclosed herein.

12 Claims, 12 Drawing Sheets

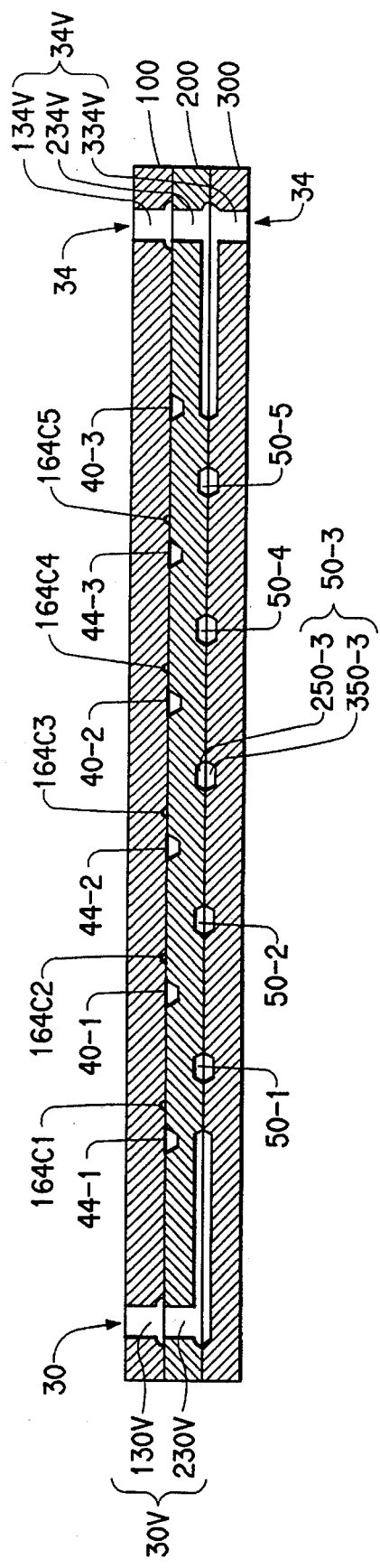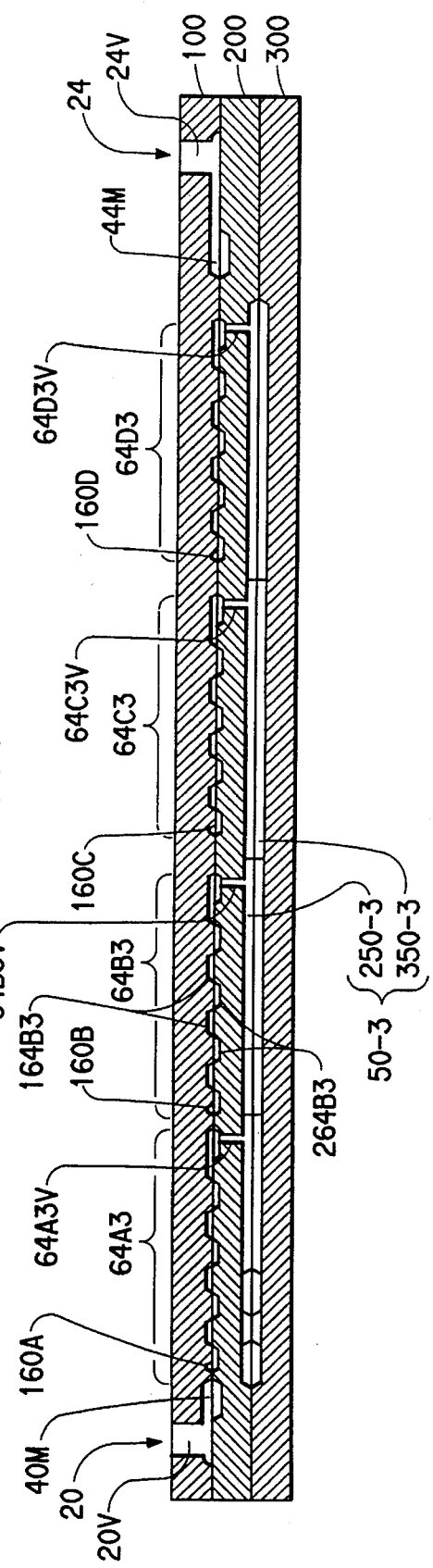

CHEMICAL MIXING AND REACTION APPARATUS

FIELD OF THE INVENTION

This invention relates to an integrated chemical processing apparatus, adapted for use with high-speed chemical reactions, which can be incorporated into a larger integral structure of multiple chemical processing units or an integrated system. More particularly, the present invention is directed to chemical processing apparatus characterized by improved rapid mixing of chemicals passing therethrough, by enhanced safety of operation, and by reduced capital investment.

BACKGROUND OF THE INVENTION

To achieve efficient chemical processing, it is necessary to precisely control a number of processing parameters, such as temperature, pressure, mixing conditions, exposure of reactants to catalyst material, exposure of reactants to products and/or byproducts and exposure of reactants to actinic radiation. Certain chemical reactions are particularly difficult to perform in an optimal manner because the chemical reactions occur very quickly, sometimes before the reactants are completely mixed together. Certain non-stoichiometric portions of the partially mixed reactants may cause reaction products other than those desired to be produced.

Conventional chemical processing equipment typically holds a relatively large volume of materials and consequently has a relatively large volume to surface area ratio, and are thus particularly ill-suited for high speed chemical reactions. Different portions of the reactant materials contained within such processing equipment are more likely to be exposed to different histories of conditions. In the case of a conventional tank reactor, for example, when reactants are introduced they are typically added in separate streams, usually at controlled rates, and are then mixed together. The so-called T-mixer has been used to mix incoming streams together before they enter a reactor tank. For chemical reactions that occur rapidly, i.e., typically in less than one second, insufficient mixing may have occurred, even with use of the T-mixer, before the reaction is well established. Portions of the incompletely mixed mixture may be starved of one or the other reactant and undesired secondary reactions may occur which produce undesired byproducts.

Rapid stirring of the reactants may reduce this mixing history difference, but will not eliminate it. As a result of the nonhomogeneous mixing history, different portions of the reactants may chemically react differently. Undesired reactions may occur in portions of the reactants that cause localized heating in these different portions. This localized heating may accelerate undesired reactions. This may result in the production of undesired waste products, which may be hazardous and/or which must be properly disposed of. In extreme situations, reaction rates may accelerate to uncontrollable levels, which may cause safety hazards, such as potential explosions.

If, however, the volume in each reactant stream being mixed is substantially reduced, then the speed of mixing of the reactants may be greatly increased to substantially improve the control of homogeneity of mixing history of the reactants.

It has been recognized that a high degree of flow turbulence enhances the ability to rapidly mix two or more reactants together. Rapid mixing is known to be important for rapid chemical reactions. A high degree of turbulence is also known to enhance heat transfer as well as mixing rates. Thus a structure having both a low contained volume and a high degree of flow turbulence is particularly advantageous for precise control of high-speed chemical reactions.

Mixer assemblies having highly turbulent flow have been constructed by machining the desired passages and chambers in metal plates, using conventional metalworking techniques, and then assembling the plates into a stack and either clamping the stack together or permanently joining the stack, as by welding or soldering. An example is U.S. Pat. No. 3,701,619. Structures formed using conventional machine tool techniques cannot economically achieve volume to surface area ratios that are very low. The materials of construction of conventional chemical processing apparatus, such as steel and specialty iron alloys, furthermore may be subject to corrosion and wear, may have undesirable effects on catalytic activity, or may "poison" a catalyst.

It is an object of the present invention to provide a chemical processing unit that mixes reactants in a rapid and efficient manner, such that chemical reactions are not limited by mass transfer considerations. The present invention provides the capability to integrate one or more mixing/reaction units with control elements into a larger integrated chemical processing system to meet the needs of a specific high-speed chemical reaction. A feature of the present invention is that it can be economically used in the laboratory, to make a range of precise sizes of mixing/reaction units, to perform the basic chemical reactions for determining the optimum operating parameters. Commercial production volumes may then be readily achieved by replicating the mixing/reaction units and operating them in parallel in a larger integrated chemical processing system.

Advantages of the present invention, when used in a larger integrated chemical processing apparatus, include the elimination of many interconnections and joints, thereby reducing the potential for leaks. These and other objects, features and advantages will become better understood upon having reference to the following description of the invention.

SUMMARY OF THE INVENTION

There is disclosed and claimed herein an apparatus for use in an integral structure for chemical mixing and reacting of one or more chemicals, comprising a plurality of laminae joined together and having a plurality of intersecting channels formed therethrough which accommodate the passage of one or more chemicals. The laminae comprise a material selected for compatibility with the one or more chemicals, the channels being formed so that chemicals are combined at intersections therein at sufficient angles of attack and shear rates so that chemical reactions are not limited by mass transfer considerations. Moreover, the shear rate is sufficient to disrupt boundary layer formation. The channels are arranged such that two or more channels are positioned at a point of intersection to form an angle of attack of from 20 to 160 degrees, preferably from 70 to 110 degrees, and most preferably about 90 degrees.

The apparatus of the invention may be prepared according to the process of the invention. The process comprises first, processing a plurality of laminae each having a top portion and a bottom portion and a desired thickness, sufficient to form desired pathways thereon or therethrough. The laminae are then stacked and bonded together in precise alignment to develop channels that intersect at a desired angle of attack.

In the process for preparing the integral structure, the pathways on facing surfaces of adjacent laminae generally form passages through the structure in the plane of the laminae having the desired cross-sectional areas. In a preferred embodiment, the ration of the length of any straight channel portion to the hydraulic diameter is less than 8. These planar passages are connected with each other and with passages orthogonal to the plane of the laminae which pass through one or more laminae to form passages having the desired overall three-dimensional shapes.

The apparatus of the present invention may be used in a method for mixing and reacting of chemicals. The method comprises: (a) introducing one or more chemicals into channels of the above-described structure; (b) directing the chemicals to traverse the channels; (c) coordinating traversal at a traversal rate so that angles of attack and shear rates are sufficient to insure that chemical reactions are not limited by mass transfer considerations; and (d) withdrawing reacted product from the channels of the structure.

The invention can be more fully understood from the following detailed description thereof in connection with accompanying drawings.

BRIEF DESCRIPTION OF THE DRAWINGS

FIG. 4 is an enlarged first sectional view, taken along section lines 4—4 of FIG. 1.

FIG. 5 is an enlarged second sectional view, taken along section lines 5—5 of FIG. 1.

FIGS. 6, 8, 9 show a first embodiment arrangement of channels that form an array of mixing elements and a distribution manifold.

FIG. 8 is an enlarged view of the portion of FIG. 6 designated as 8—8 showing mixing element 64A3.

FIG. 9 is an enlarged view of a portion of FIG. 8 designated as 9—9.

DETAILED DESCRIPTION OF THE INVENTION

Figure 1:
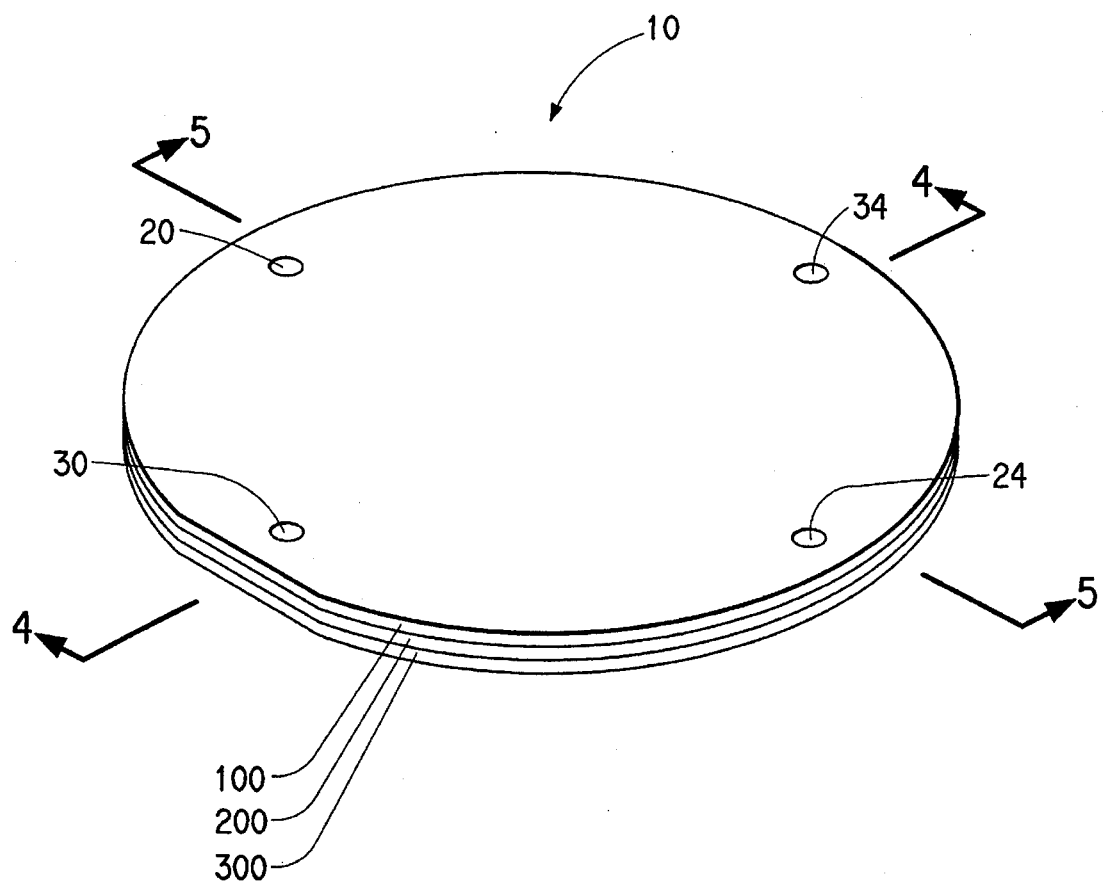
FIG. 1 is a perspective view of an apparatus of the present invention.

The present invention is characterized by small channels of complex three-dimensional shapes which: (1) can create a high degree of flow turbulence that enhances rapid mixing and heat transfer; (2) intersect with other channels in a shearing fashion at a predetermined angle of attack; (3) have a very low volume to surface area ratio that minimizes temperature gradients and further enhances heat transfer; and (4) controls residence time of materials therein, to achieve more precise temperature control, and a more uniform temperature history, for every portion of the entire volume of reactants mixed and reacted. Channels small enough that they will not allow the propagation of a flame may be readily formed and thus can be used to safely react potentially explosive chemical reactants. The channels may measure as small as about 10 micrometers in cross section.

Throughout the following detailed description, reference characters between 1 and 99 refer to overall features of the invention. That is, these features may only be apparent on joinder of adjacent laminae. For example, in FIG. 7 chamber 50M is comprised of chamber 250M on laminae 200 and chamber 350M on laminae 300. Laminae are numbered 100, 200, 300, and specific features on each respective lamina are numbered 101 to 199, 201 to 299, etc. with the last two digits corresponding to the overall feature of the invention. The suffix letter "V" is used to designate interlamina vertical pathways, also known as "vias" through the structure. Similarly, suffix "M" indicates a manifold chamber within a manifold; suffixes "S" and "T" indicate straight and turning portions of pathways. Suffixes comprising a hyphen and numeral (−1, −2, etc.) are used to designate parts of specific elements, such as individual branches of the branched manifolds. A capital letter and number are appended to the reference character to designate elements of an array (e.g., mixer 64A2 of array 64). Numerals enclosed in curved braces { } designate crystal planes in a crystalline material (e.g., {100}).

Referring to FIG. 1, there is shown an apparatus 10 exemplary of the present invention. This apparatus 10 is comprised of a plurality of laminae 100, 200, 300 fused together to form an integral structure. One or more inlet ports (here, inlet ports 20 and 24 are shown) enable the flow of reactants into the apparatus and one or more outlet ports (here, outlet ports 30 and 34 are shown) enable the flow of the resulting reaction products out of the apparatus. It is to be appreciated that the inlet ports 20 and 24 and outlet ports 30 and 34 do not necessarily have to be positioned only through lamina 100 as shown but may extend through all three laminae (e.g., outlet port 34 in FIG. 4). These elements could be arranged to meet the integral structure at the side of a lamina, for example (not shown). The laminae may be comprised of either the same or different materials. The laminae (also known as wafers) 100, 200, 300 preferably are comprised of materials from groups III, IV or V of the Periodic Table, silicon being the most preferred material. If desired one or more of the laminae may be comprised of an alternate material, such as ceramic, a glass material such as Pyrex or other compatible materials.

Figure 2:
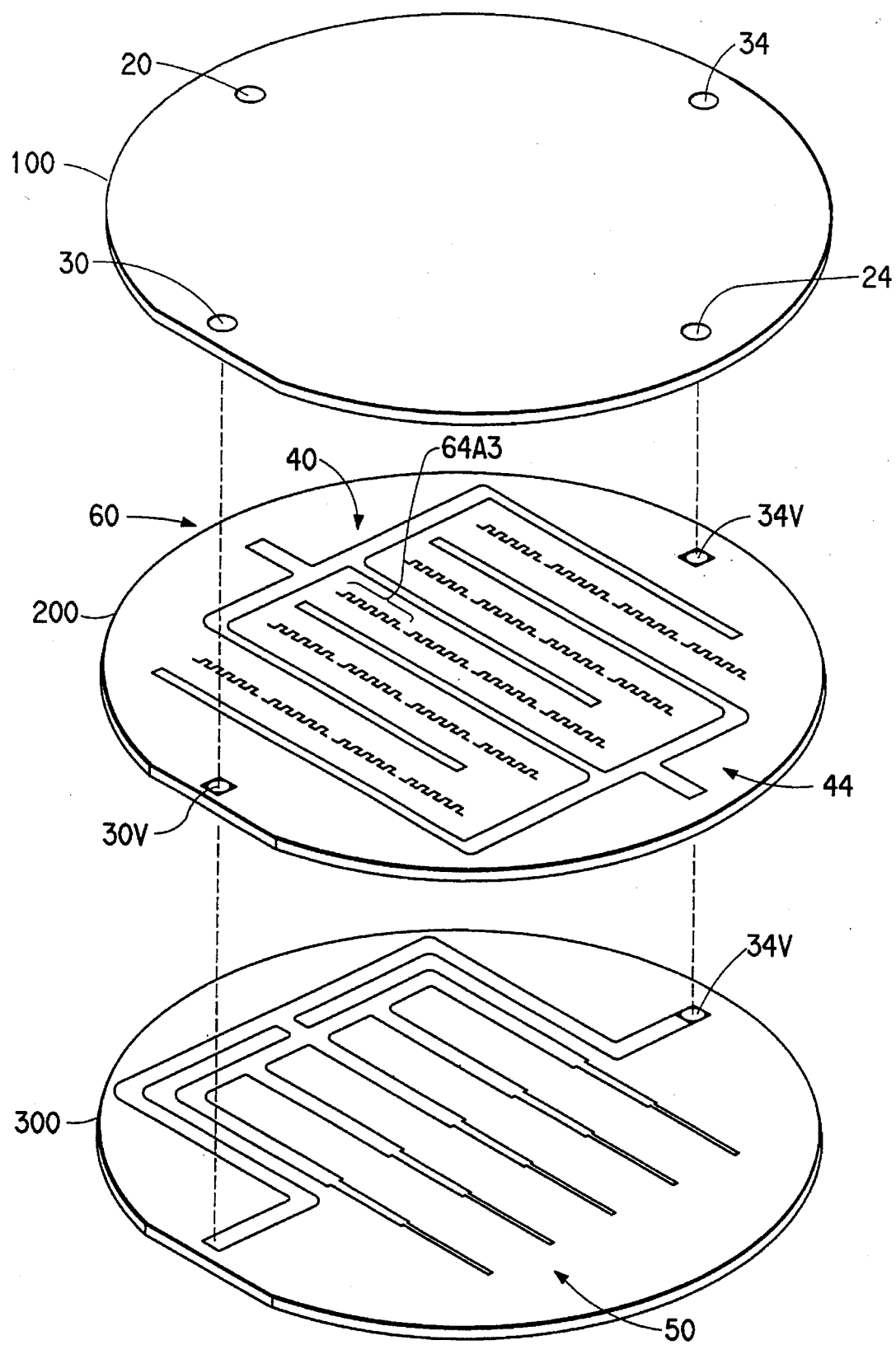
FIG. 2 is an exploded perspective view of the apparatus, as seen from above, showing the top surfaces of three laminae which are used to form the structure.
Figure 3:
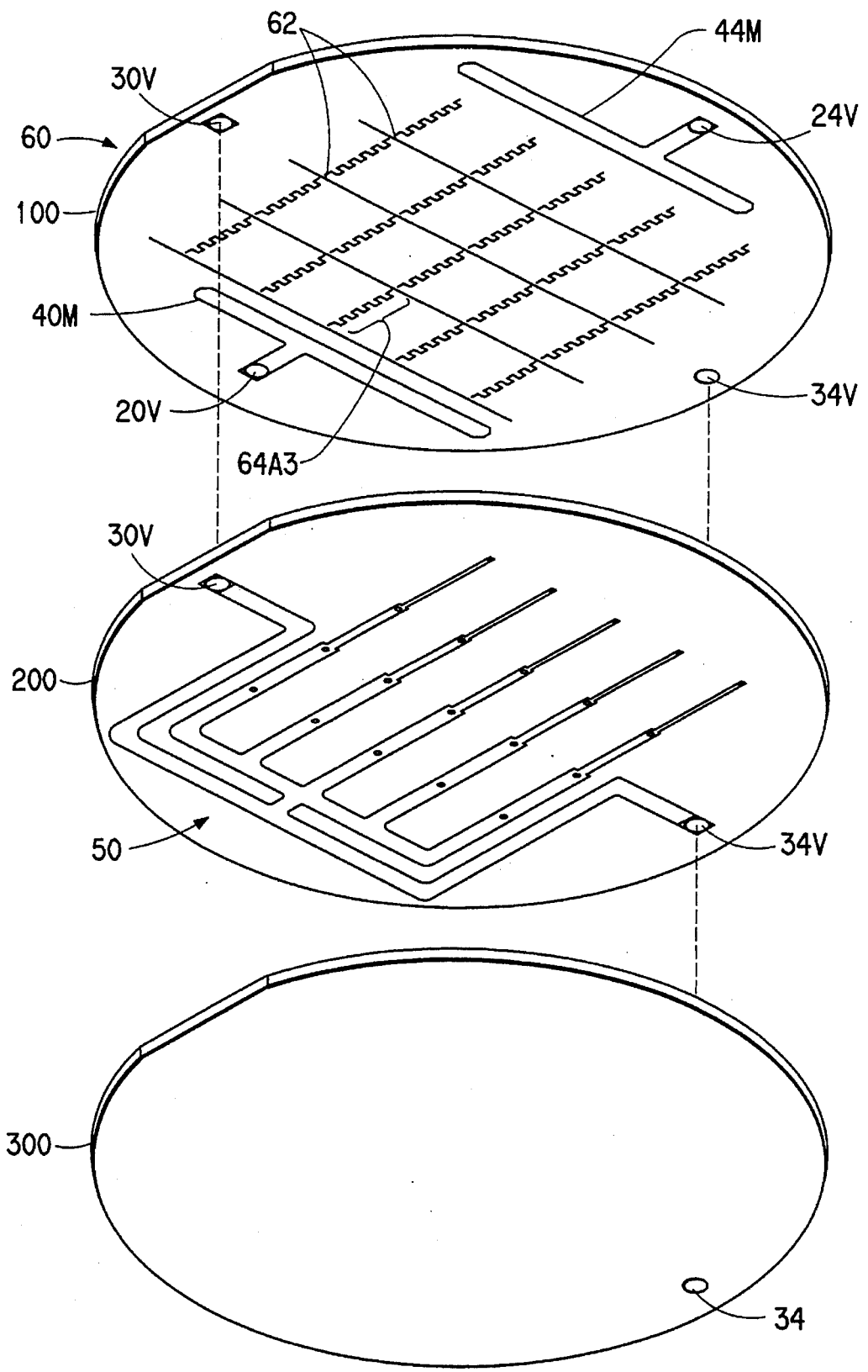
FIG. 3 is an exploded perspective view of the apparatus, as seen from below, showing the bottom surfaces of three laminae which are used to form the structure.

FIG. 2 shows the top surfaces of the three laminae 100, 200, 300 and FIG. 3 shows the bottom surfaces of the three laminae 100, 200, 300 which are used to form the apparatus of FIG. 1. Operative features of the apparatus shown in FIGS. 2 and 3 are: two distribution manifolds 40, 44 formed by pathways in the bottom surface of lamina 100 and the top surface of lamina 200; an array 60 of mixer/reaction chambers represented by a series/parallel arrangement of T-mixers 62 and intersecting-channel mixing elements 64 formed by corresponding pathways in the bottom surface of lamina 100 and the top surface of lamina 200; a fork-shaped collection manifold 50 formed by corresponding pathways in the bottom surface of lamina 200 and the top surface of lamina 300.

In sectional views of FIGS. 4 and 5 the vertical scale is exaggerated for clarity of illustration. Although the laminae of the apparatus are fused into an integral structure when completely fabricated, for clarity of illustration the interfaces between the laminae are shown in FIGS. 4 and 5.

In FIGS. 4 and 5, which illustrate typical flow passages in the interior of the structure, the vertical pathways 20V, 24V, 30V, 34V which connect respectively with the inlet ports 20, 24 and outlet port 30 in lamina 100 and outlet port 34 in outer laminae 100 and 300, are typically formed by grinding or drilling through the lamina.

In FIG. 4 three passages 40-1, 40-2, 40-3, which are branches of distribution manifold 40 and three passages 44-1, 44-2, 44-3, which are branches of distribution manifold 44 are formed in the top surface of lamina 200. Five passages 50-1, 50-2, 50-3, 50-4, 50-5, which are branches of collection manifold 50, are respectively formed by corresponding mirror image pathways 250-1, 250-2, 250-3, 250-4, 250-5 (see also FIG. 7) in the bottom surface of lamina 200 and pathways 350-1, 350-2, 350-3, 350-4, 350-5 (FIG. 7) in the top surface of lamina 300.

In FIG. 5 the central axis of a third horizontal passage 50-3 (see also FIG. 7), which comprises the center branch of a 5-branch collection manifold 50, lies in the plane of the sectional view. The horizontal passage 50-3 is formed by corresponding mirror image pathways, respectively pathway 250-3 (FIG. 7) in the bottom surface of lamina 200 and pathway 350-3 (FIG. 7) in the top surface of lamina 300. The passages which comprise the 5-branch collection manifold 50 in the exemplary apparatus are formed using an etching technique.

In FIG. 5 passages 160A, 160B, 160C, 160D, in combination with the branches 40-1, 44-1; 44-1, 40-2; 40-2, 44-2; and 40-3, 44-3 of distribution manifolds 40, 44 (FIGS. 4 and 7) form an array of T-mixer structures 62 whose operation will be subsequently described in conjunction with FIGS. 6, 7. The passages 164 in the bottom surface of the lamina 100 and the passages 264 in the top surface of lamina 200 cooperate to form an array of mixers (sometimes referred to as mixing elements or mixing chambers) 64, each of which comprises a plurality of intersecting channels (FIG. 6).

At the left of FIG. 5 is vertical passage 20V, which extends through lamina 100 to connect inlet port 20 with the common chamber 40M of distribution manifold 40. At the right of FIG. 5 is vertical passage 24V, which extends through lamina 100 to connect inlet port 24 with common chamber 44M of manifold 44. A third branch 50-3 of 5-branch manifold 50 is formed by corresponding mirror image pathways 250-3 and 350-3 (FIG. 7) in the bottom surface of lamina 200 and the top surface of lamina 300, respectively. Mixing chambers 64A3, 64B3, 64C3, 64D3 are visible in FIG. 5.

Figure 6:
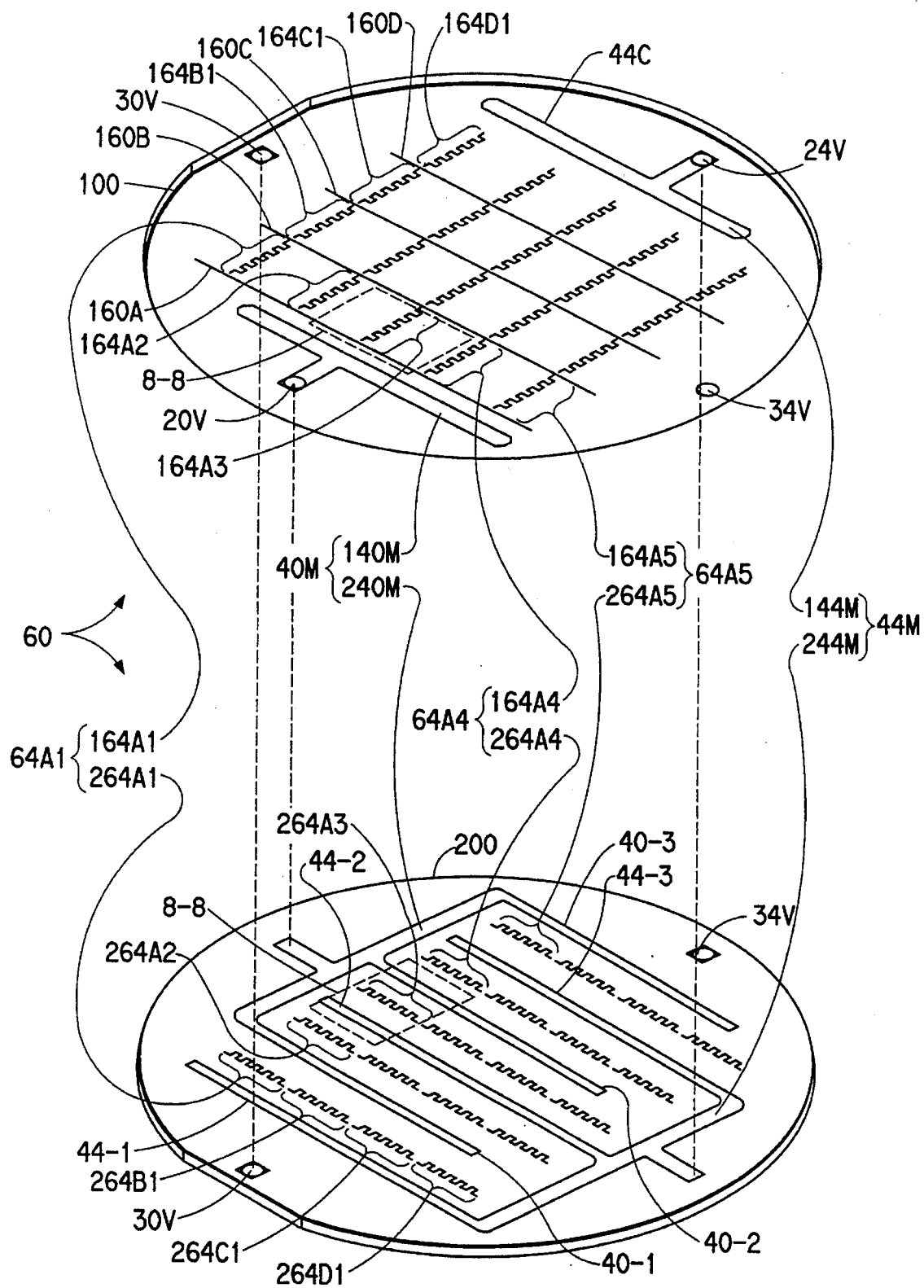
FIG. 6 is an exploded perspective view of a portion of the apparatus of FIG. 1, showing the bottom surface of a first lamina 100 and the top surface of the second lamina 200.

FIG. 6 shows an arrangement of pathways that cooperate to form an array of mixer/reaction chambers 60 and a pair of distribution manifolds 40, 44. First distribution manifold 40 is comprised of common chamber 40M and branch passages 40-1, 40-2, 40-3. The chamber 40M is formed by the combination of chamber 140M, on the bottom surface of the first lamina 100, and chamber 240M on the top of lamina 200. Also shown is the opening of vertical pathway 20V which connects input port 20 with the common chamber 40M.

Second distribution manifold 44 is comprised of common chamber 44M and branch passages 44-1, 44-2, 44-3. The chamber 44M is formed by the combination of chamber 144M, on the bottom surface of the first lamina 100, and chamber 244M on the top of lamina 200. Also shown is the opening of vertical pathway 24V which connects input port 24 with the common chamber 44M.

A series of serpentine pathways 164 are formed on the bottom surface of the first lamina 100, which cooperate with corresponding serpentine pathways 264 of lamina 200, to form the array of intersecting-channel mixing elements 64 (here, 64A5 formed from 164A5 and 264A5 in FIG. 6) of the mixer array 60. The mixer array 60 comprises multiple groups 60A (e.g., 64A1-64A5), 60B, 60C, 60D of multiple parallel mixers 64. In the specific example shown, there are five mixers in each group, that are respectively designated 64A1, 64A2, 64A3, 64A4, 64A5 through 64D1, 64D2, 64D3, 64D4, 64D5. FIG. 6 also shows chambers 40M and 44M, previously mentioned.

Each mixer 64 is comprised of two serpentine pathways, a first pathway 164 formed on the bottom of the first lamina 100 and a second pathway 264 formed on the top of the second lamina 200. The first and second pathways are each comprised of a series of straight segments and turning segments connected together to form a continuous path. The first and second pathways are positioned on abutting surfaces with the segments longitudinally offset such that the corresponding turning segments intersect repeatedly. The mixer element 64 (as illustrated by mixer element 64A2) may be described as having a double serpentine path (best seen in FIG. 11).

Figure 8:
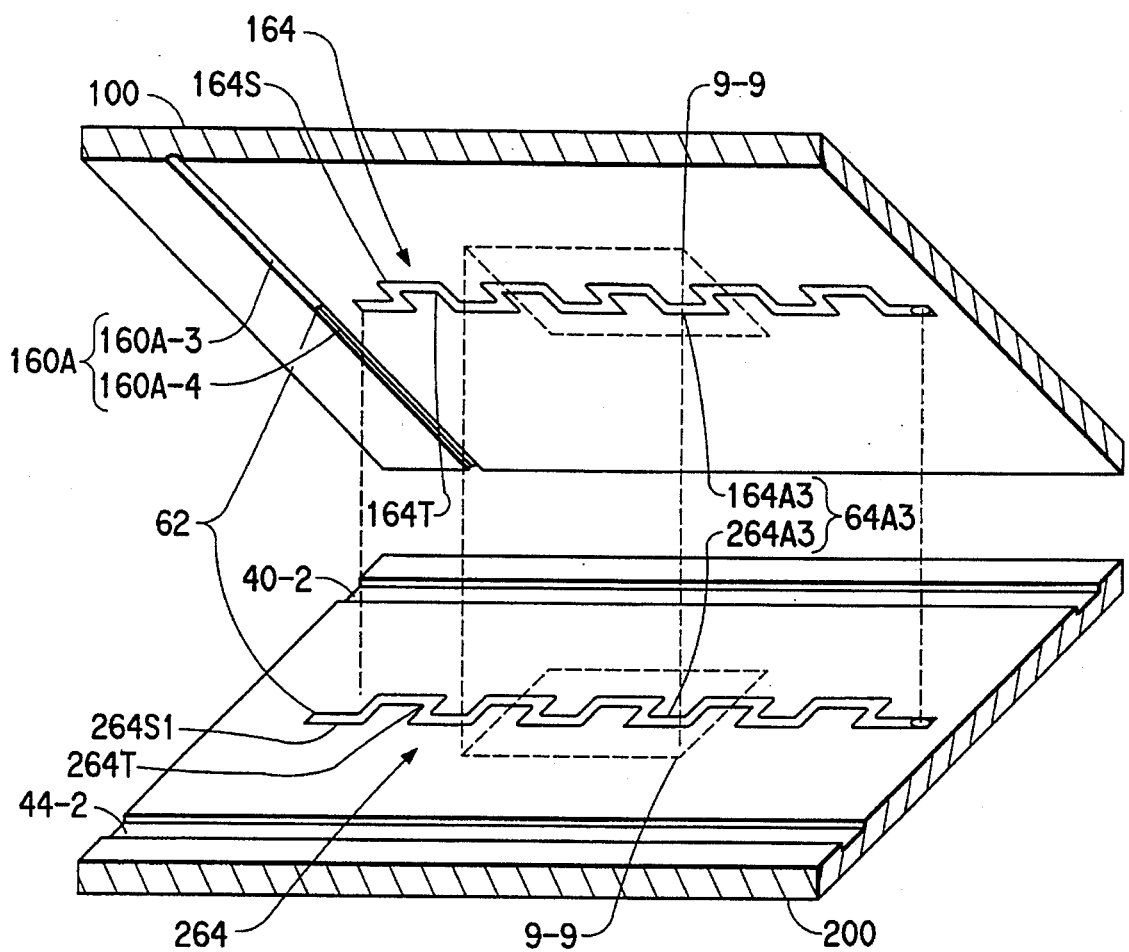

Four pathways 160A, 160B, 160C and 160D, cooperate respectively with branches 40-1, 40-2, 40-3 of manifold 40, branches 44-1, 44-2, 44-3 of manifold 44 and a first straight segment 264S of each serpentine pathway 264 to form a series of T-mixers 62 (best seen in FIG. 8). Each first straight segment 264S thus connects each T-mixer 62 with each serpentine mixer 64 of mixer array 60.

Figure 7:
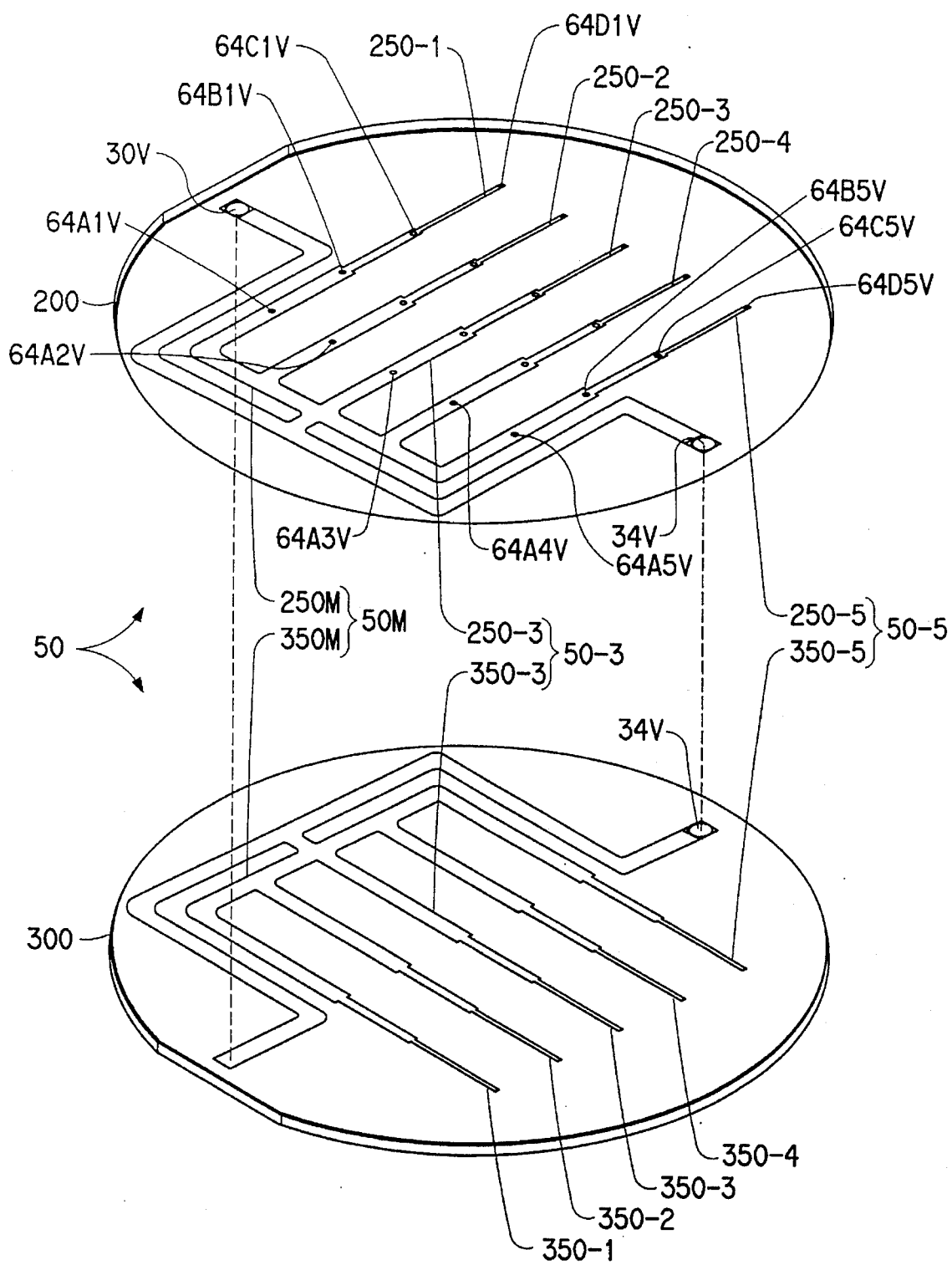
FIG. 7 is an exploded perspective view of the bottom of a second lamina 200 and the top of a third lamina 300 showing channels that form a distribution manifold.

FIG. 7 shows the arrangement of pathways that cooperate to form a collection manifold 50. As seen in FIGS. 6 and 7, collection manifold 50 is comprised of common chamber 50M and branch passages 50-1, 50-2, 50-3, 50-4, and 50-5. The vertical pathways 64A1V, 64A2V, 64A3V, 64A4V, and 64A5V connects the last segment of mixer 64A1, 64A2, 64A3, 64A4, 64A5 with the collection manifold branches 50-1, 50-2, 50-3, 50-4, and 50-5, respectively; the vertical pathway 64B1V, 64B2V, 64B3V, 64B4V, and 64B5V connects the last segment of mixer 64B1, 64B2, 64B3, 64B4, 64B5 with the collection manifold branches 50-1, 50-2, 50-3, 50-4, and 50-5, respectively; the vertical pathway 64C1V, 64C2V, 64C3V, 64C4V, and 64C5V connects the last segment of mixer 64C1, 64C2, 64C3, 64C4, 64C5 with the collection manifold branches 50-1, 50-2, 50-3, 50-4, and 50-5, respectively; and the vertical pathway 64D1V, 64D2V, 64D3V, 64D4V, and 64D5V connects the last segment of mixer 64D1, 64D2, 64D3, 64D4, 64D5 with the collection manifold branches 50-1, 50-2, 50-3, 50-4, and 50-5, respectively. Vertical passage 30V connects collection manifold 50 with the outlet port 30 on the first side of lamina 100. Vertical passage 34V connects manifold 50 with both outlet ports 34 on the first side of lamina 100 and the second side of the lamina 300, as best seen in FIG. 4.

As best seen in FIG. 8, each pathway 160 cooperates with manifolds 40 and 44 and a first straight segment of serpentine pathway 264 to form a T-mixer 62. This connects with a serpentine mixer 64, comprised of the multiple straight segments 264S and turning segments 264T. As also may be seen in FIG. 8 each portion of pathway 160, e.g., portion 160A-3 between manifold 44-2 and segment 264S1 and portion 160A-4 between manifold 40-2 and segment 264S1, may be of a different cross-sectional size to provide the desired flow rate of each chemical being mixed. The number of straight and turning segments 164S, 164T and 264S, 264T and the cross-sectional size of each segment of 164 and 264 may be selected, according to the mixing requirements and flow characteristics of the chemicals being processed.

Figure 9:
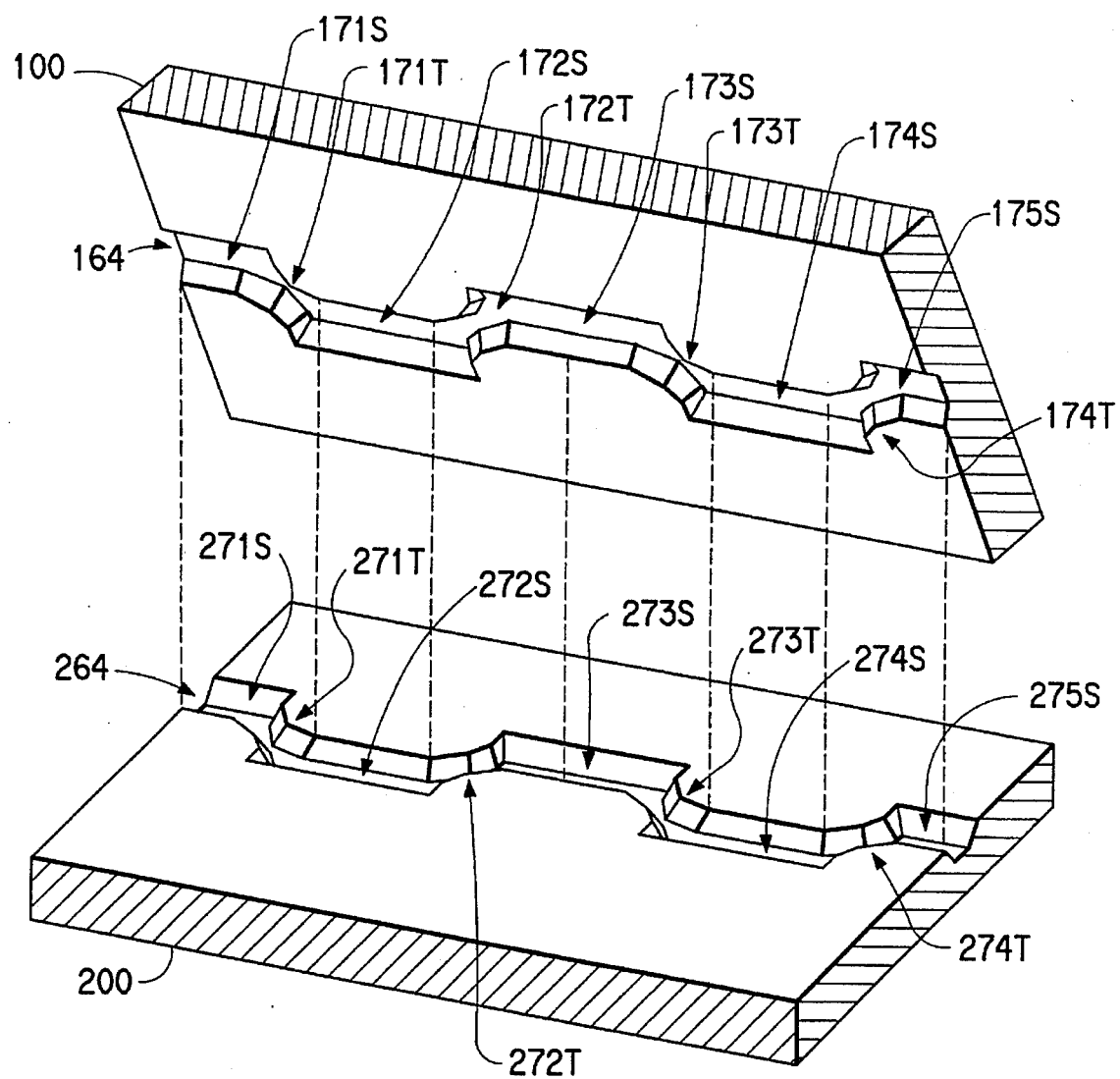

As seen in FIG. 9 the serpentine pathways 164, 264 are comprised of straight segments designated with a suffix letter "S" (171S, 172S, 173S, 174S, 175S, and 271S, 272S, 273S, 274S, 275S) and turning segments designated with a suffix letter T (171T, 172T, 173T, 174T, 175T, and 271T, 272T, 273T, 274T, 275T). Corresponding turning segments (e.g., 171T, 271T) of pathways 164 and 264 intersect in a juxtaposed fashion at a ninety (90) degree angle of attack. By slightly offsetting the position of pathway 164 relative to pathway 264 this angle of attack may be changed if desired. By rotating lamina 100 relative to lamina 200, and suitably altering the spacing of the straight segments (suffix S) and turning segments (suffix T), almost any desired angle of attack may be achieved. Angles of attack within the range of 20 degrees to 160 degrees may be readily realized, as is contemplated being within the scope of this invention.

Figure 10:
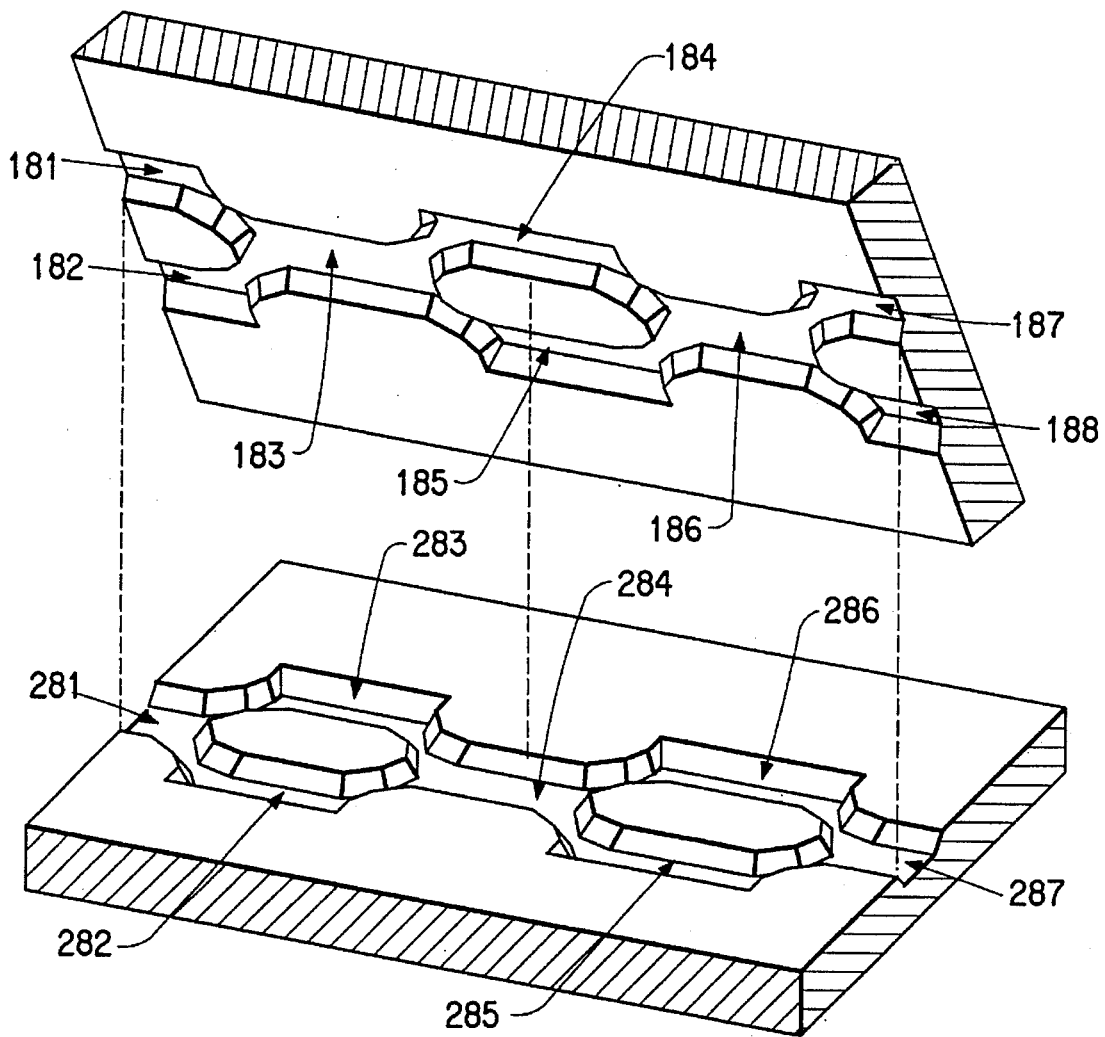
FIG. 10, which corresponds in scale to FIG. 9, shows a second embodiment arrangement of channels that form an array of mixing elements and a distribution manifold.

FIG. 10 shows an alternate arrangement of channels, which may be used in place of the arrangement shown in FIGS. 6, 8, and 9. FIG. 10 shows two channels 181, 182 in the bottom surface of lamina 100 that join at a point of intersection, traverse in a combined configuration as channel 183, are subsequently separated into two channels 184, 185, and then recombined as channel 186, separate into channels 187, 188. Channel 281 in the top surface of lamina 200 separates at a point of intersection into two channels 282, 283, which are then recombined as channel 284, are subsequently separated into two channels 285, 286, and then recombined as channel 287. Channel 181 intersects with channel 282 and channel 182 intersects with channel 283 at predetermined angles of attack. Similarly channel 184 intersects with channel 282, channel 185 intersects with channel 283, channel 184 intersects with channel 285, channel 185 intersects with channel 286, channel 187 intersects with channel 285, channel 188 intersects with channel 286.

Figure 11:
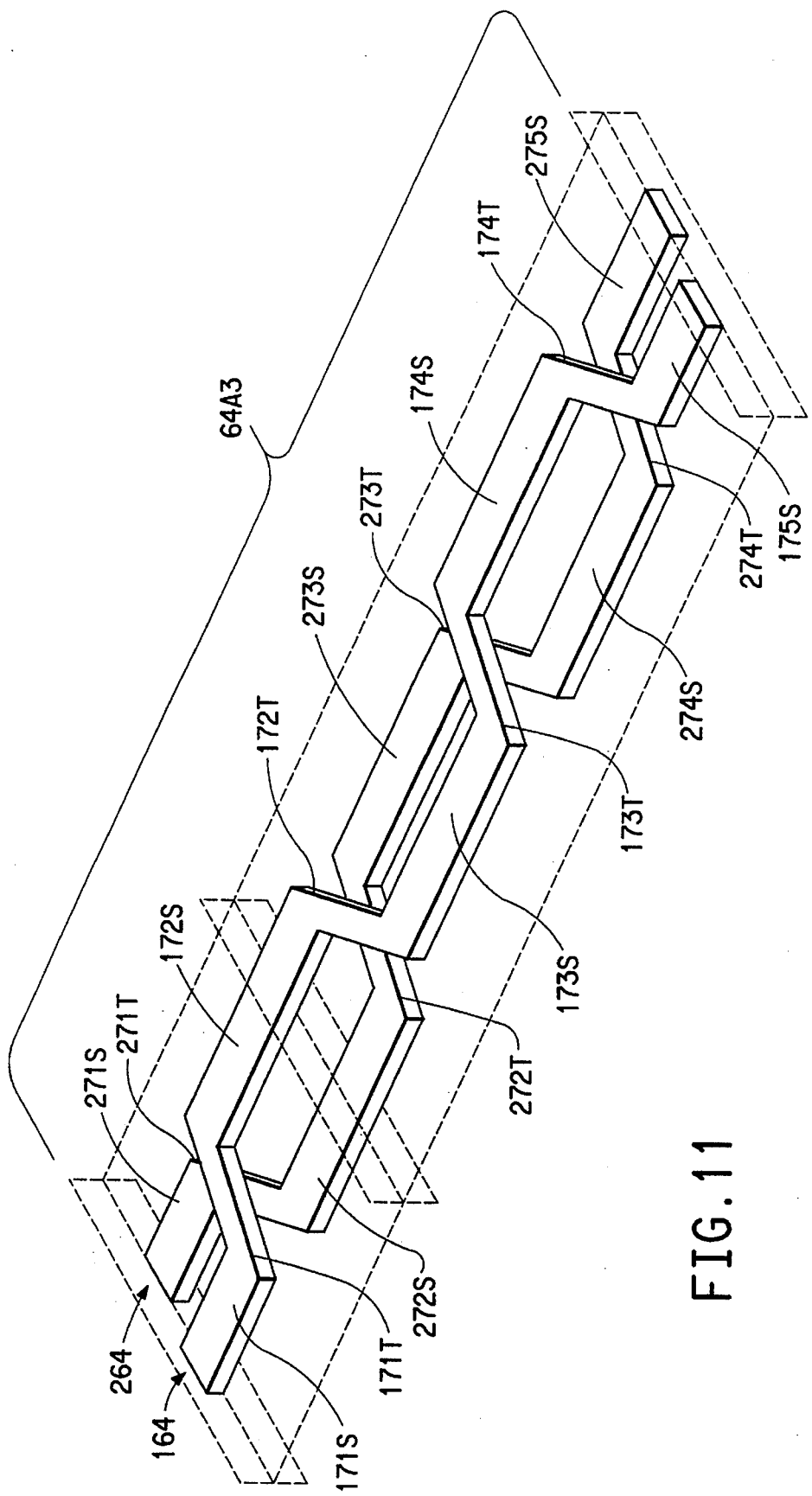
FIG. 11 is a simplified perspective view which illustrates the channels of FIG. 8 and the intersections of those channels.

FIG. 11 depicts the channels of FIG. 9 in a somewhat simplified manner to better visualize the shape, relative position and intersections of the channels. As may be appreciated from FIGS. 9 and 11, two channels repeatedly intersect to form a double helix configuration, wherein a first channel 164 is comprised of straight segments and turning segments in a first plane, a second channel 264 is comprised of straight segments and turning segments in a second plane.

Chemicals within a first channel are repeatedly subjected to the sequence of: (a) a turbulent left hand turn, (b) a turbulent left hand juxtaposed intersection with chemicals in a second channel, (c) a turbulent right hand turn, (d) a turbulent right hand turn, (e) a turbulent right hand juxtaposed intersection with chemicals in the second channel, (f) a turbulent left hand turn.

Figure 12:
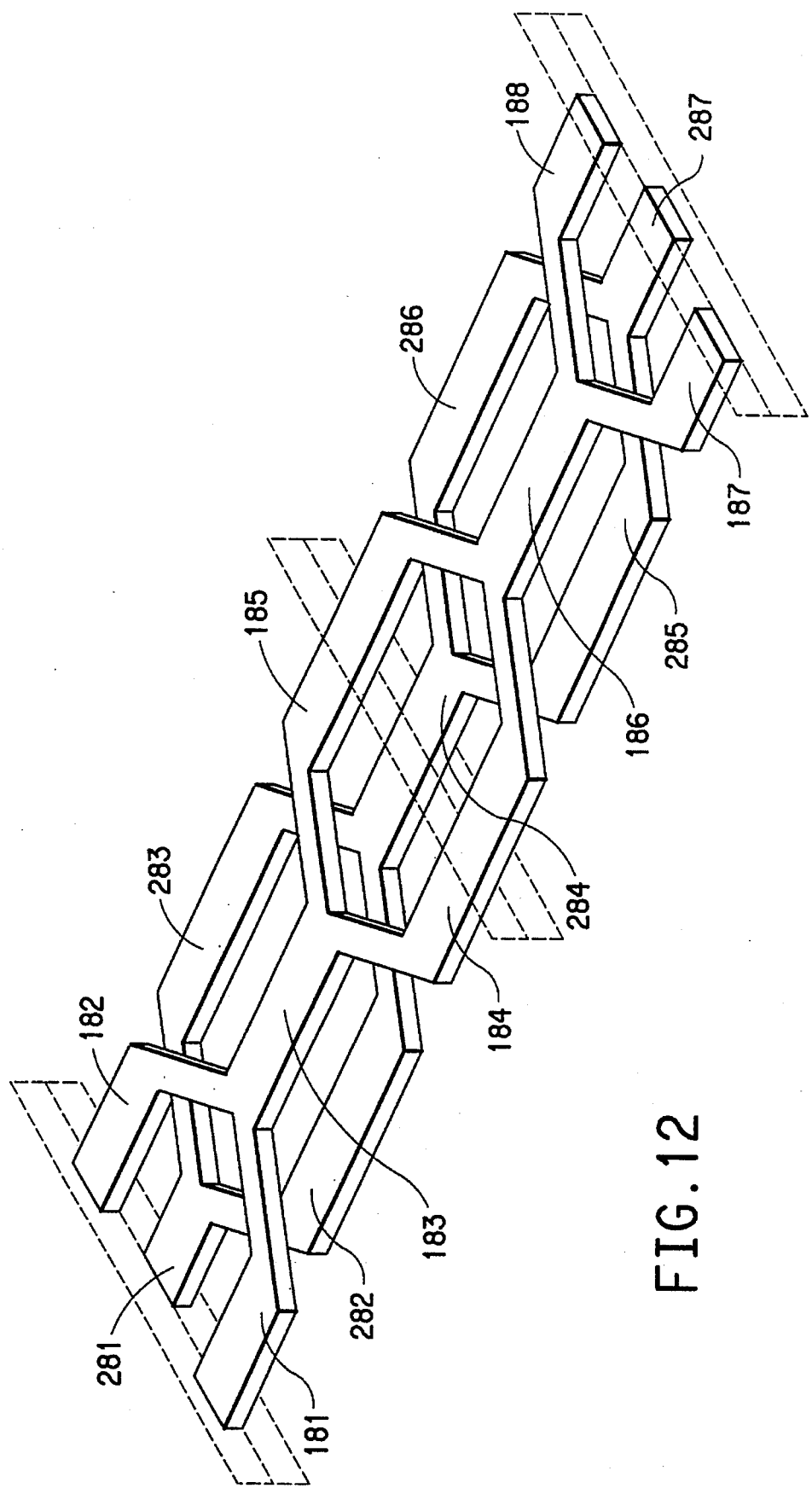
FIG. 12 is a simplified perspective view which illustrates the channels of FIG. 10 and the intersections of those channels.

FIG. 12 depicts the channels of FIG. 10 in a somewhat simplified manner to better visualize the shape, relative position and intersections of the channels. In this figure it can be seen that the two channels intersect at angles of attack. Each channel comprises two or more channels that join at a point of intersection, traverse in a combined configuration, are subsequently separated into two or more channels, and then subsequently rejoin.

Figure 13A:
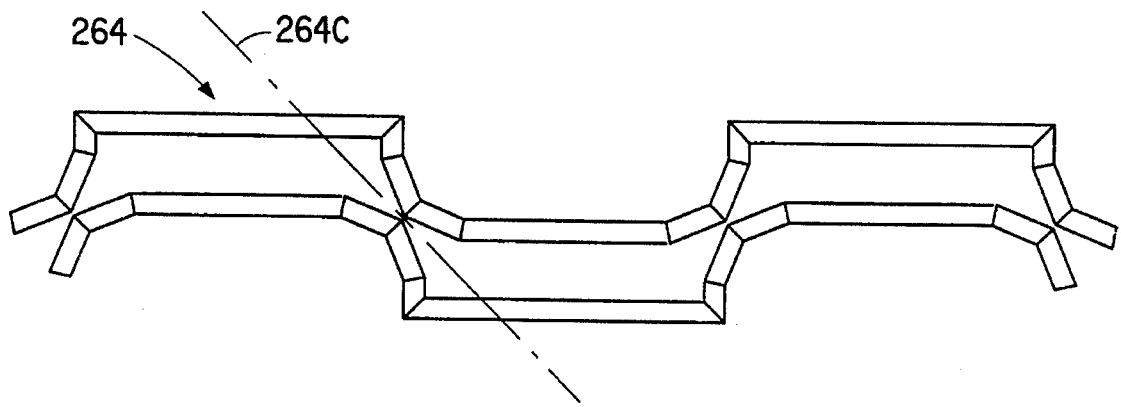
FIG. 13a–c is a plan view of the channels of FIG. 9 showing the channels separately and superimposed.
Figure 13B:
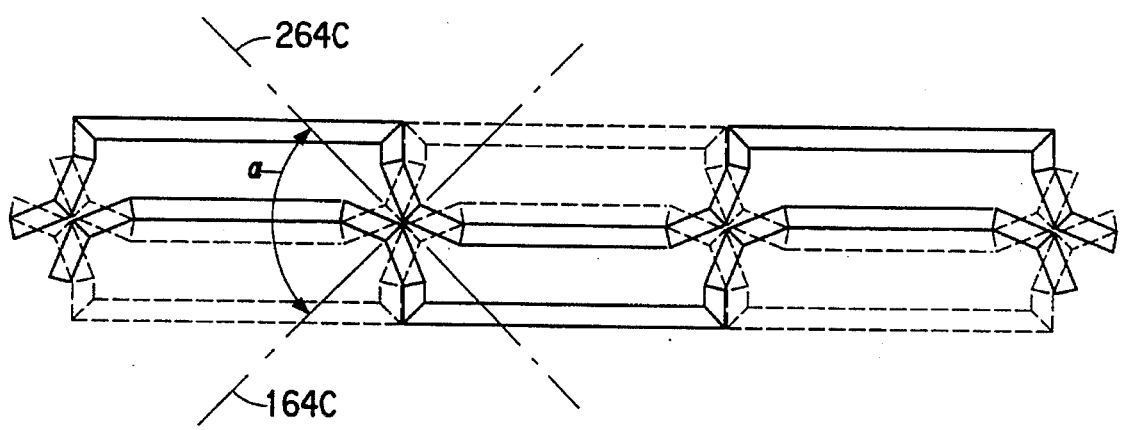
Figure 13C:
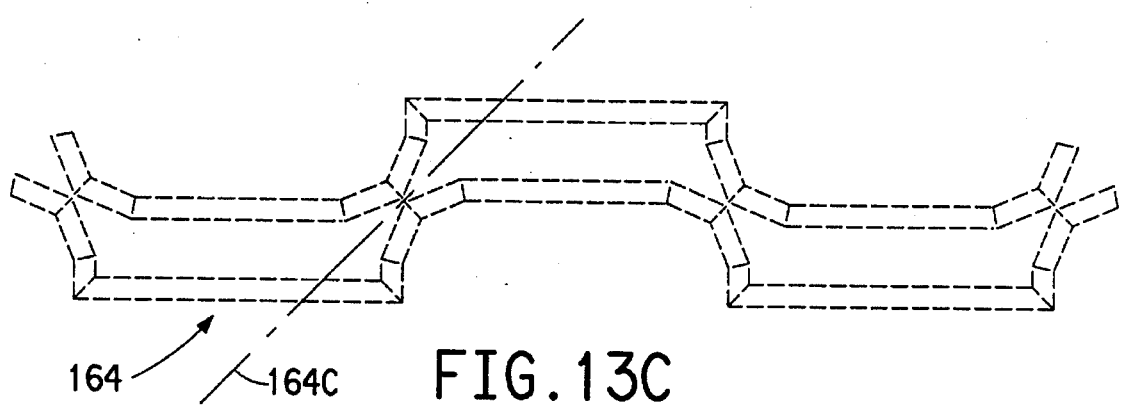

FIG. 13 (a)–(c) is a plan view of the channels of FIG. 9. It shows channel 164 alone (FIG. 13(c)), channel 264 alone (FIG. 13 (a)), and 164 superimposed with 264 (FIG. 13(b)).

At the point of intersection of the channels a centerline 164C of channel 164 and a centerline 264C of channel 264 are shown. The included angle α between these centerlines is defined as the "angle of attack" of the two channels.

Multiple units of the chemical mixing and reaction apparatus can be used in sequence or in tandem. The incorporation of units in any number of sequential or tandem patterns is a design choice to be made by those skilled in the art and according to the desired chemical processing result.

As seen in FIGS. 9 and 10 the particular angles of the channel walls produced at the turning sections (e.g., 171T) are due to the orientation of the crystal planes of the silicon. In the illustrated example each lamina comprises a silicon wafer which has the major planar surface of the wafer in the {100} crystal plane. The sides of the straight segments (e.g. 171S, 271S) are aligned to be in the {110} crystal planes. When etched with an anisotropic etch, the major sides of the segments are bevelled from the vertical at a 57 degree angle and are in the {111} crystal planes. The outside corners between the straight segment 171S and the turning segment 171T, are not sharp right angles but are beveled by two so-called bevelling faceting planes, which are the {210} crystal planes, thus producing the bevelled corners which are best seen in FIGS. 9 and 10.

FABRICATION OF THE APPARATUS

The apparatus of the present invention is achieved by a multi-step fabrication process. First, a series of planar laminae or wafers, are processed to form desired patterns of pathways on one or both major surfaces of each lamina or through the thickness of the lamina. The laminae are then joined together to form a plurality of intersecting channels that accommodate the passage of chemicals.

In the preferred embodiment of the figures, the laminae are arranged and precisely oriented to locate the channels in adjacent laminae. These channels may be continuous or discontinuous along each of the laminae. Discontinuous channels are continuously aligned between adjacent laminae sufficient to form a continuous pathway therethrough. A typical channel is comprised of straight segments and turning segments in a first plane, straight segments and turning segments in a second plane and transition segments between the two planes. The straight or turning segments of a channel may be formed as a groove or trough entirely within one lamina. When assembled this groove cooperates with the facing planar surface of the adjacent lamina to close the cross-section of the channel. This is best illustrated by the cross-sectional view of distribution manifold 40 (seen as 40-1, 40-2, and 40-3) in FIG. 4. Mirror image grooves or troughs on facing surfaces of adjacent laminae may cooperate to form a channel having a symmetrical cross-section. This is best illustrated by the cross-sectional view of collection manifold 50 (seen as 50-1, 50-2, 50-3, 50-4, and 50-5) in FIG. 4. The transition segments of the channels may be passages that pass through a lamina to connect a channel segment on a first lamina with another segment on a second lamina or with a distribution or collection manifold. This is best illustrated by the cross-sectional view of vertical pathways 64A3V through 64D3V in FIG. 5.

Processing of Laminae

The processing of the laminae to form pathways may be performed by a procedure selected from the group of: subtractive processes, additive processes, and forming processes. Subtractive processes comprise chemical etching, electrochemical machining (ECM), electrical discharge machining (EDM), laser ablation, drilling and cutting, abrasive grinding and single diamond point cutting (such as used to fabricate ceramic parts). Additive processes comprise deposition processes, such as electroforming, selective plating, chemical vapor deposition, stereo lithographic photoforming, and welding. Forming processes comprise molding, casting, and stamping. Wear resistant coatings, such as metalloid carbides, in the form of thin films, may be optionally deposited on the processed laminae before bonding.

Materials of Construction

Selection of lamina materials is based upon the material's compatibility with the chemicals to be mixed and reacted. As used herein "compatibility with the chemicals to be mixed and reacted" includes without limitation: resistance to chemical degradation; operating conditions, such as temperature and pressure; thermal conduction requirements; required features to be created in the lamina, including size, geometrical shape and precision; the sealability of the lamina material; and economic considerations.

A variety of materials, may be used to construct the mixing/reaction units of the present invention. Crystalline materials that can be processed using photolithographic techniques may be used, especially when a mixing/reaction unit with extremely small cross-sectional passages are desired, for instance when gasses that react rapidly are to be processed. Such crystalline materials would typically include elements from groups III through V of the periodic table, for example silicon. Other compound materials, selected for their resistance to chemical attack, may be used to fabricate the laminae or may be used as coatings on the laminae. Ceramic materials may be used, such as silicon carbide, tungsten carbide, alumina and sapphire for instance using known molding, pressing and Sintering techniques, to form the laminae. Thin films may be deposited on the surfaces of the laminae, such as by chemical vapor deposition techniques, to improve resistance of the passages to chemical attack or to facilitate bonding of the laminae. Glass materials, such as fused quartz, pure silica glass and borosilicate glass, as well as composite materials, such as ceramic composites and polymeric composites may be used.

For example, wafers similar to those used to fabricate semiconductor electronics components, such as single crystal silicon wafers, may be used. For such silicon wafers a combination of subtractive techniques may be used to form the passages. The laminae are subsequently stacked in precise alignment and joined together (as by bonding or clamping) into an integral structure. As illustrated in the example of FIG. 1, three laminae are joined as an apparatus. The laminae may be of identical or different materials. The outer laminae may be silicon or a protective material such as metal, ceramic, composite material or glass while the inner lamina would typically be silicon. If all the laminae are silicon, thermal fusion bonding is a preferred method of joining the laminae because the strength of the bond achieved approaches that of the laminae themselves.

OPERATION OF THE APPARATUS

Having reference to FIGS. 1–3, the two materials to be reacted flow into the unit through input ports 20, 24, through vertical passages 20V, 24V into distribution manifolds 40, 44 and into mixer array 60. Optional temperature control means (not shown) may be used to maintain the mixer array 60 at the desired temperature. The mixed material is collected in collection manifold 50 and passed through vertical passage 30V to the outlet port 30 or through vertical passage 34V to the outlet port 34.

Additional microfabricated process control elements, such as proportional valves, pressure, temperature and flow sensors, may be incorporated with the structure of the present invention. These elements, when used with external controls could regulate the flow of reactants within the integrated chemical processing unit and thus control the residence time. Any rapid chemical process, such as hydrolysis, nitration, polymerization, and oxidation may be practiced using the integrated structure of the present invention.

FABRICATION OF THE LAMINAE

In the preferred embodiment, most steps of the fabrication process generally correspond to known semiconductor processing techniques for silicon wafers. The photo-tools for the patterns for each side of each wafer are prepared using well known computer-aided-design techniques. Already polished silicon wafers, having the {100} crystal plane and other orientations on the major surfaces may be purchased from commercial sources. The polished wafers are first cleaned using a well-known general cleaning technique, such as the "RCA process". An oxide film is grown on the wafer using well-known standard techniques. A nitride layer is deposited over the oxide layer using a known chemical vapor deposition method. The nitride layer protects the oxide layer from attack by the etch used to etch the silicon. A photoresist is applied, following the directions of the photo resist manufacturer, using the well-known spin coating technique.

The desired pattern is formed by first masking the wafer with a photo-tool having an image of the desired pattern, which is precisely aligned with the crystal planes of the wafer. Straight portions of the pattern are typically aligned along the {110} crystal plane. After exposing and developing the photoresist, the undeveloped photoresist is stripped to expose part of the nitride/oxide film layer. The exposed nitride/oxide film is finally etched to form an nitride/oxide film negative image of the desired pattern.

The pathways are formed in the surfaces of the wafers by etching the silicon, using either isotropic or anisotropic etch, the choice of which is dependent on the shape of the pathway desired. Curved shapes are etched using an isotropic etch. Straight shapes may employ either etch, depending on the desired cross-sectional shape pathway. If a trapezoidal cross-section is desired an anisotropic etch is used.

If a given wafer is to be etched on both major surfaces using the same etch, both sides of the wafer may be masked with resist, the resist exposed with the desired pattern on each surface, developed, washed and the nitride/oxide etched simultaneously on both surfaces. Then the silicon may be simultaneously etched on both surfaces. If different types of etchants are to be used on each side of the wafer, all steps for the first etch are completed and then the steps are repeated for the second etch. After all the etching steps have been completed the vertical passages or vias through the wafer are formed by laser cutting through the wafers, typically using a pulsed neodymium-YAG laser cutting system. After laser cutting, the wafers are again recleaned to remove cutting debris. The remaining nitride layer of the negative image is removed from the wafer, by using a suitable solvent, such as boiling phosphoric acid, exposing the undamaged oxide layer. The remaining oxide layer negative image may optionally be removed from the wafer, by using a suitable solvent, such as buffered hydrogen fluoride. The wafer is recleaned, using the technique as described above.

Other techniques may be used which are dependent upon the lamina material. Laminae which are comprised of group III, IV or V material are processed using etching, grinding, drilling and polishing techniques. Laminae comprised of glass, Pyrex, or fused silica are fabricated using conventional glass cutting, drilling, grinding, and polishing techniques. Laminae comprised of ceramic materials may be formed by slip casting, consolidated by pressing and fired using well known techniques.

When all the laminae have been individually processed the laminae are carefully stacked in a precisely aligned manner and fusion bonded. To achieve good bonding of silicon laminae, the surfaces should be highly planar and the oxide layers on each surface should be undamaged. Since silicon is somewhat transparent in the infrared, a microscope with an infrared video camera may be used, with optional alignment indicia on each wafer, to insure precise alignment of the wafers before they are fusion bonded. If an outer lamina is comprised of glass, this lamina is then anodically bonded to the already fused stack of inner laminae.

Those skilled in the art, having the benefit of the teachings of the present invention as hereinabove set forth, can effect numerous modifications thereto. It is readily appreciated that such modifications can be made without departing from the spirit of the scope of the present invention. Accordingly, such modifications are to be construed as being encompassed within the scope of the present invention as set forth in the appended claims.

We claim:

1. A mixing apparatus, comprising:

a plurality of laminae, and having at least one inlet port and at least one outlet port, each lamina having a first planar surface and a second planar surface, the laminae being joined together such that respective first surfaces are joined to respective adjacent second surfaces, and having a plurality of intersecting channels formed therethrough, the channels being connected to said at least one inlet port and said at least one outlet port, wherein the channels are generally planar, and one or more channels are formed as grooves in said first planar surface of said at least one lamina and one or more channels are formed as grooves in said adjacent second planar surface of an adjoining lamina, and the channels are generally serpentine and are offset from each other such that the channels of said at least one lamina and said adjoining lamina repeatedly intersect in a juxtaposed manner and form predetermined angles of attack at points of intersection.

2. The apparatus of claim 1 wherein the plurality of channels of said at least one lamina and said adjoining lamina are positioned at a point of intersection to form an angle of attack of 20 to 160 degrees.

3. The apparatus of claim 3 wherein the angle of attack is 70–110 degrees.

4. The apparatus of claim 3 wherein the angle of attack is 90 degrees.

5. The apparatus of claim 1 wherein the plurality of channels of said at least one lamina join at a point of intersection, traverse in a combined configuration, are subsequently separated, and then recombined at predetermined angles of attack.

6. The apparatus of claim 1 wherein at least one channel of said first planar surface of at least one lamina and one channel of said adjacent second planar surface of an adjoining lamina repeatedly intersect to form a double helix configuration, wherein the channel of said first planar surface is comprised of straight segments and turning segments in a first plane, each straight segment having a predetermined length and a predetermined cross-section, the channel of said adjacent second planar surface is comprised of straight segments and turning segments in a second plane, each straight segment having a predetermined length and a predetermined cross-section, wherein the channel of said first planar surface repeats the sequence of:

(a) a turbulent left hand ram, (b) a turbulent left hand juxtaposed intersection with the channel of said adjacent second planar surface, (c) a turbulent right hand turn, (d) a turbulent right hand turn, (e) a turbulent right hand juxtaposed intersection with the channel of said adjacent second planar surface, and (f) a turbulent left hand turn.

7. The apparatus of claim 6 wherein the ratio of the length of any straight channel segment to the hydraulic diameter is less than 8.

8. The apparatus of claim 1 wherein said laminae comprise a material selected from the group consisting of non-metal elements of groups III, IV and V of the Periodic Table, ceramics, glasses, polymers, composites and metals.

9. The apparatus of claim 1 wherein said laminae comprise a material selected from the group consisting of elements of groups III, IV and V of the Periodic Table.

10. The apparatus of claim 9 wherein said laminae comprise a material selected from group IVA of the Periodic Table.

11. The apparatus of claim 10, wherein said laminae comprise a material selected from the group consisting of silicon and germanium.

12. The apparatus of claim 8, wherein said laminae comprise a ceramic selected from the group consisting of silicon carbide, sapphire, and alumina.

\* \* \* \* \*